United States Patent [19]

Sarh

[11] Patent Number: 4,967,947
[45] Date of Patent: Nov. 6, 1990

[54] MULTI-FUNCTION RIVETING/FASTENING MACHINE AND METHOD OF OPERATING

[76] Inventor: Branko Sarh, 2597 Devonshire Rd., Riverside, Calif. 92506

[21] Appl. No.: 172,188

[22] Filed: Mar. 23, 1988

[51] Int. Cl.$^5$ ............................................. B21J 15/30
[52] U.S. Cl. ...................................... 227/52; 227/51; 227/156
[58] Field of Search ........................... 227/51, 52, 156

[56] References Cited

U.S. PATENT DOCUMENTS

| | | | |
|---|---|---|---|
| 3,534,896 | 10/1970 | Speller et al. | 227/51 |
| 4,662,556 | 5/1987 | Gidlund | 227/51 X |
| 4,759,109 | 7/1988 | Mason et al. | 227/51 X |

Primary Examiner—Paul A. Bell
Attorney, Agent, or Firm—Herbert E. Kidder

[57] ABSTRACT

A machine comprising a horizontally elongated base having pairs of pylons slidably mounted on opposite sides of the base for horizontal movement along the length thereof, forming in effect, a moveable C-frame. The workpiece is fixedly supported on the base in a substantially vertical position, and the pylons of each pair work together on opposite sides of the workpiece to process rivets/fasteners or perform other functions. Each of the pylons comprises a vertical first component and a horizontal second component. The second component is movable vertically on the first component, and is also movable horizontally toward and away from the workpiece. Carried on the end of each of the horizontal second components adjacent the workpiece is a tool assembly holder that is rotatable about horizontal and vertical axes. Each tool assembly holder is adapted to detachably receive a tool assembly, and each tool assembly consists of tools for successively performing various functions, the tools on one side of the workpiece being axially aligned with an companionate to the tools on the other side, so that simultaneous operation of the opposed tools performs the desired function.

10 Claims, 5 Drawing Sheets

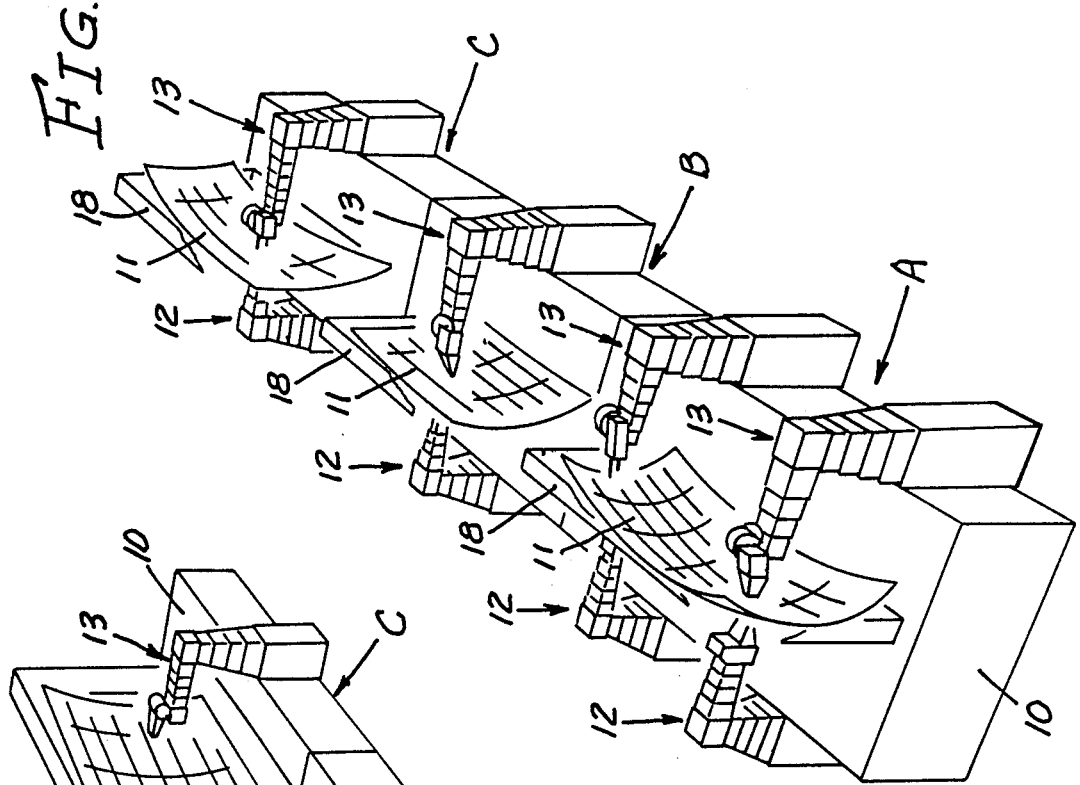
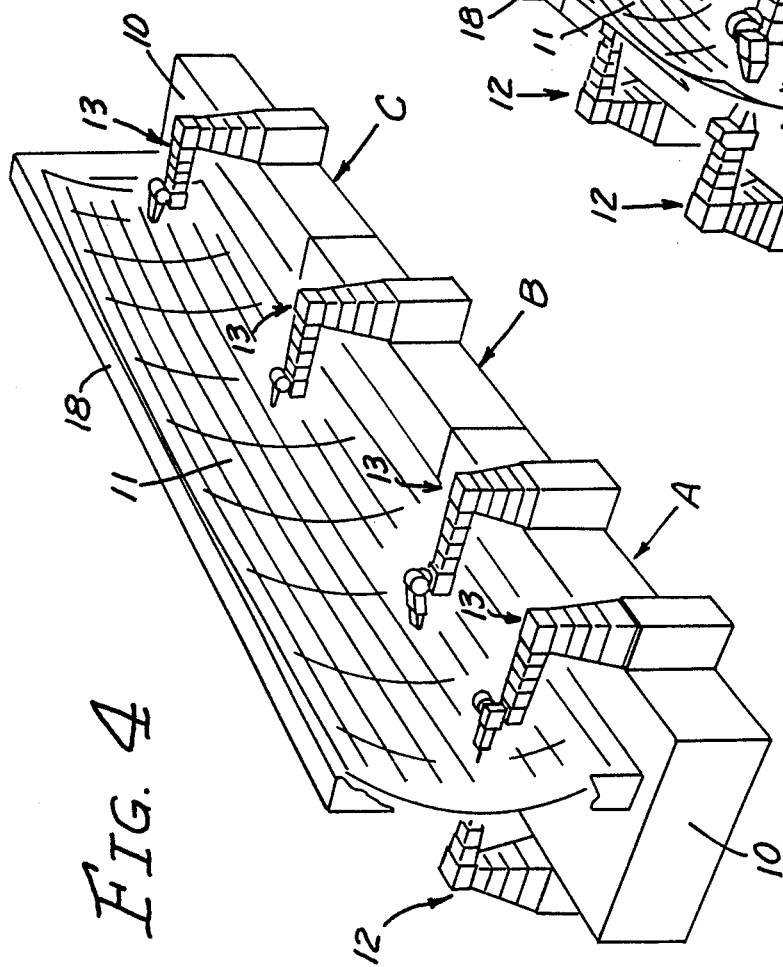

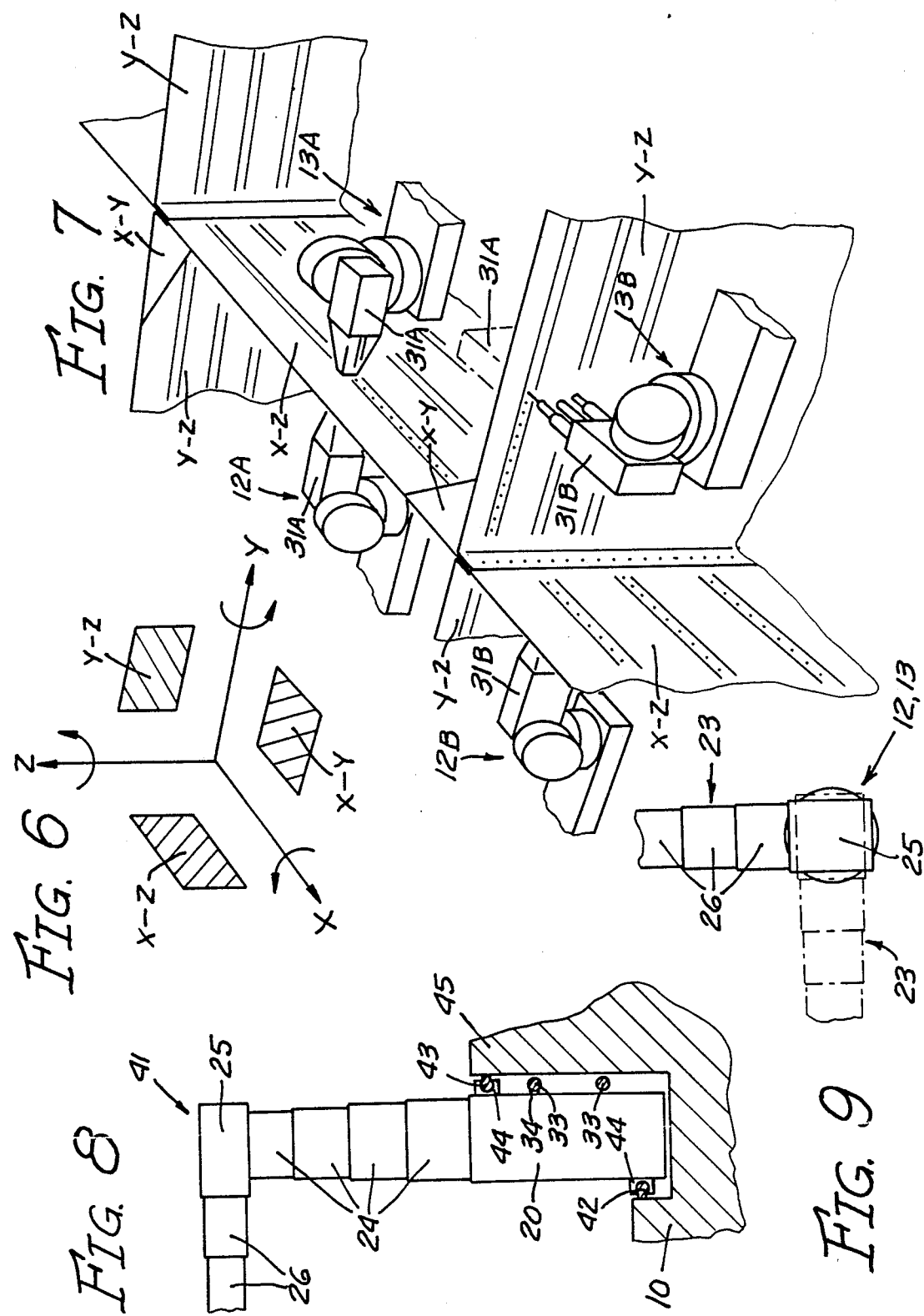

MULTI-FUNCTION RIVETING/FASTENING MACHINE AND METHOD OF OPERATING

BACKGROUND OF THE INVENTION

The present invention pertains to a multi-function riveting/fastening machine of the type used for attaching frames and stringers to the skin for fuselage and wing panels of large commercial aircraft. Structures of this type may range from a few feet up to forty feet or more in length, and up to ten or more feet in width.

Heretofore, panels of this size have been riveted, using stationary C-frame riveting machines and a movable workpiece holder and positioner. The C-frame riveting machine is what is known as a "hard automation" machine, that performs the functions of part clamping, drilling, counter-sinking, rivet feeding, and rivet squeezing in automatic succession. The workpiece is moved in a generally horizontal position from one rivet position to the next by the holder and positioner, which is usually computer controlled and has up to five degrees of freedom of motion. In some cases, the C-frame riveting machine may be movable along the longitudinal axis of the workpiece, with the workpiece holder and positioner being movable along other linear and rotational axes. This process is very effective and reliable as far as the process of putting rivets into structure is concerned, and is well suited to the assembly of small- to medium-sized panels. However, as panels become larger, there is a serious problem with the handling of the large structures due to the weight of the part positioner, and unpredictable deflection of the part and holder. The workpiece holder and positioner becomes very complex and costly, and must be "fine-tuned" for precision in placing the rivets. One disadvantage of this prior art arrangement is that it requires a large floor space area to allow the panel to be moved in all directions. Since the workpiece and holder must be moved from each rivet position to the next, and the workpiece and positioner are relatively flexible, with a certain amount of unpredictable deflection, it is a time-consuming operation, especially since with the huge machine with its large floor space, only one rivet can be placed at a time.

SUMMARY OF THE INVENTION

The primary object of the present invention is to provide a multifunction riveting/fastening machine that is particularly designed for attaching frames and stringers to the skin of large commercial aircraft panels, and which does so without any of the limitations or shortcomings of prior art machines. This object is achieved by fixedly supporting the workpiece in a vertical position on the machine base between opposed pairs of pylons, which are movable along the length of the machine base, and which also have portions movable along the vertical axis as well as the horizontal axis toward and away from the workpiece. Mounted on the outer ends of the movable portions are tool holders which are rotatable about two or three axes, and the tool holders of opposed pylons carry exchangeable companionate tools that cooperate with one another on opposite sides of the workpiece to perform the desired function. Thus, the two independently movable pylons and machine base constitute, in effect, a movable C-frame type of riveting machine which is capable of attaching rivets or other fasteners to any part of the workpiece without moving the workpiece.

Since the workpiece is mounted stationary on the machine base, a minimum of floor space is required. Moreover, with the workpiece mounted in the vertical position, and the bottom edge of the workpiece holder supported along its entire length on the machine base, deflection of the workpiece is virtually eliminated.

Relative movement between the workpiece and tools is now accomplished solely by movement of the pylons and tool holders about multiple axes, whereas formerly such relative movement was accomplished mainly by moving the workpiece. Limitations on the size and shape of the workpiece are much less stringent than with prior riveting machines, since the machine base can be made to any length to hold the longest workpiece, whereas the part positioner and holder of prior machines has a practical limit to its length which cannot be exceeded.

Another important object of the invention is to provide a machine that can use multiple pairs of pylon units spaced apart along the length of the workpiece and moving along the same machine base, so as to allow for simultaneously performing a plurality of riveting operations on the same structure.

A further object of the invention is to provide a machine capable of attaching fasteners to a workpiece having two or more planes that are more or less perpendicular to one another, which cannot be done by prior art riveting machines.

These and other objects and advantages of the present invention will become apparent to those skilled in the art from a consideration of the following detailed description of the preferred embodiments thereof, taken with the accompanying drawings.

BRIEF DESCRIPTION OF THE DRAWINGS

FIG. 4 is a schematic perspective view of the riveting machine of the invention, showing a plurality of pairs of pylons working on a large workpiece panel;

FIG. 5 is a view similar to FIG. 4, showing the multiple pylons working on several smaller workpieces at the same time;

FIG. 6 is a schematic diagram, showing different axes and planes that can be worked on with this machine;

FIG. 7 is a fragmentary perspective view, showing opposed pylons working on a multi-plane structure;

FIG. 8 is a fragmentary side view of one pylon, showing a modified form of attachment between the machine base and pylon; and FIG. 9 is a fragmentary plan view of an alternative form of pylon, wherein the horizontally extendable portion is rotatable about a vertical axis.

DESCRIPTION OF THE PREFERRED EMBODIMENT

Figure 1:
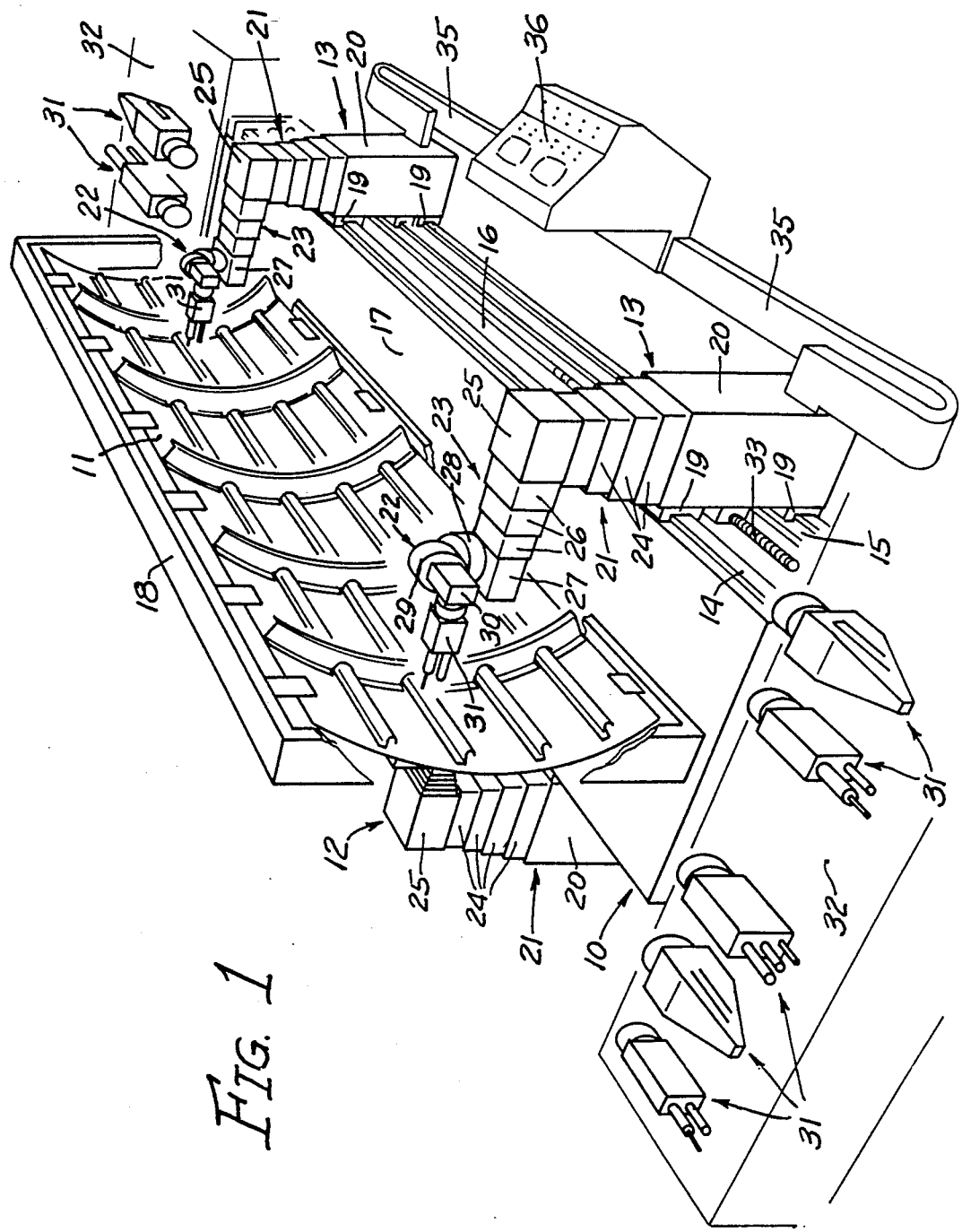
FIG. 1 is a schematic perspective view of a riveting/fastening machine embodying the principles of the invention.

As shown in the drawings, the multi-function riveting/fastening machine of the invention comprises a central machine base 10, upon which the workpiece 11 is mounted, and at least one pair of opposed pylons 12 and 13 which are disposed on opposite sides of the machine base and are slidably supported on parallel rails 14 and 15 on the vertical sides 16 of the machine base.

The workpiece 11 is a 3-dimensional structure having length, width and height, and consists of sheet metal to be riveted or otherwise attached to stringers and other structural members. The workpiece is usually a large fuselage panel or aircraft wing section, and generally consists of a blend of cylindrical, flat plane, and spherically curved members which are shaped to provide the best possible aerodynamic form. 00.

The machine base 10 is an elongated rectangular body, preferably of cast concrete, although it might be a fabricated steel structure, the length of which is equal to the longest length workpiece that is excepted to be assembled. The top surface 17 of the machine base is flat, and is provided with clamping devices (not shown) for holding the workpiece holder 18 in which the workpiece 11 is supported.

The parallel rails 14 and 15 are spaced as far apart as possible on the vertical side walls of the machine base 10, and slidably supported on these rails are linear bearings 19 that are fixed to the adjacent surfaces of pylon bases 20. The pylon bases 20 are extremely rugged to withstand large forces and bending moments, and may be constructed as shown in the drawings, in the form of a rectangular box open at the top to receive a vertically extendable upper portion 21. The function of the vertically extendable upper portion 21 is to provide linear vertical motion for the tool holder unit 22 which is carried at the end of horizontally extendable portion 23 projecting from the top end of portion 21. In the preferred form illustrated in the drawings, the pylon portion 21 comprises a plurality of telescopic sections 24, each of approximately the same length as the base 20 and all of said sections extending down into the interior of the base when fully retracted. The sections 24 slide vertically within one another and within base 20 when the pylon portion 21 is extended or retracted, and to eliminate friction and backlash between the components, they are separated by preloaded linear bearings (not shown) using roller or ball bearings.

The upper pylon portion 21 may be extended or retracted by means of an electric-motor-driven telescopic spar similar to that shown and described in my copending application Ser. No. 07/090,545, filed Aug. 27, 1987, U.S. Pat. No. 4,824,053 to which reference may be had. Or alternatively, a multiple leadscrew arrangement might be used.

Carried at the top end of the pylon portion 21 is a box 25 which is open on the side facing the workpiece 11, and the horizontally extendable portion 23 projects from the interior of the box 25 toward the workpiece. The pylon portion 23 also comprises a plurality of telescopic sections 26. Telescopic sections 26 are each of approximately the same length as box 25, and all of the sections can be retracted into the interior of the box. As in the case of the vertical pylon portion 21, the telescopic sections 26 are separated from one another by preloaded linear bearings, and may be extended or retracted by means of an electric-motor-driven telescopic spar, or by multiple leadscrews. The pylon sections 21 and 23 are not necessarily telescopic, as shown, but might comprise a single vertical post and horizontal beam, wherein the beam is movable vertically on the post, and is also movable toward and away from the workpiece.

At the outer end of the horizontally extendable pylon portion 23 is a box 27, and carried on the top surface of the box is the tool holder unit 22. Unit 22 consists of at least two rotational components 28 and 29, which are rotatable about mutually perpendicular axes, one of them vertical and the other horizontal. Mounted on the final rotational element 29 is a tool holder 30. The tool holder 30 is adapted to be detachably coupled to any one of a series of tool assemblies 31 which may perform the functions of clamping, drilling, rivet forming, sealant application, inspection, ultrasonic welding, etc. For most riveting operations, each tool assembly 31 carries a plurality of tools for successively clamping the workpiece, drilling the rivet hole, feeding a rivet into the hole, and squeezing the rivet. The tools on the assemblies 31 on the back side of the workpiece are complementary to the tools on the assemblies' front side, and the tools on both sides are axially aligned as the tools are successively presented to the workpiece. Multi-function tool assemblies of the type described are known in the art, and it is not considered necessary to describe them in further detail herein.

With other types of fasteners, such as 2-piece fasteners where a bolt is inserted from one side, and a nut is either turned onto threads on the bolt, or is squeezed onto the bolt end, the nut is applied by the tool assembly on the back side of the workpiece. Other tool assemblies 31 might be sealant applicators, or inspection tools. These various tool assemblies 31 for performing other functions are detachably mounted on tool racks 32 at the ends of the machine base 10, and are presented to the pylons 12, 13 in such a manner that the tool holder 30 can be turned and otherwise positioned so that it can be coupled to the appropriate tool assembly. When this has been accomplished, the tool holder 30 is raised by the pylon, detaching the tool assembly from its support on the rack 32.

The pylons 12, 13 are moved along their respective rails 14, 15 on opposite sides of the machine base 10 by means of leadscrews 33. In the preferred form of the invention, as shown in the drawings, there are two leadscrews 33 on each side of machine base 10, with one leadscrew driving one pylon, and the other leadscrew driving the other pylon. Each pylon has a stationary nut 34 that meshes with the threads of its respective leadscrew, so that when the leadscrew is turning, the pylon is moved along its rail. Electric motors (not shown) drive the leadscrews 33 when the pylons are to be moved, and the said motors may be enclosed within the machine base 10 at the ends thereof.

Figure 3:
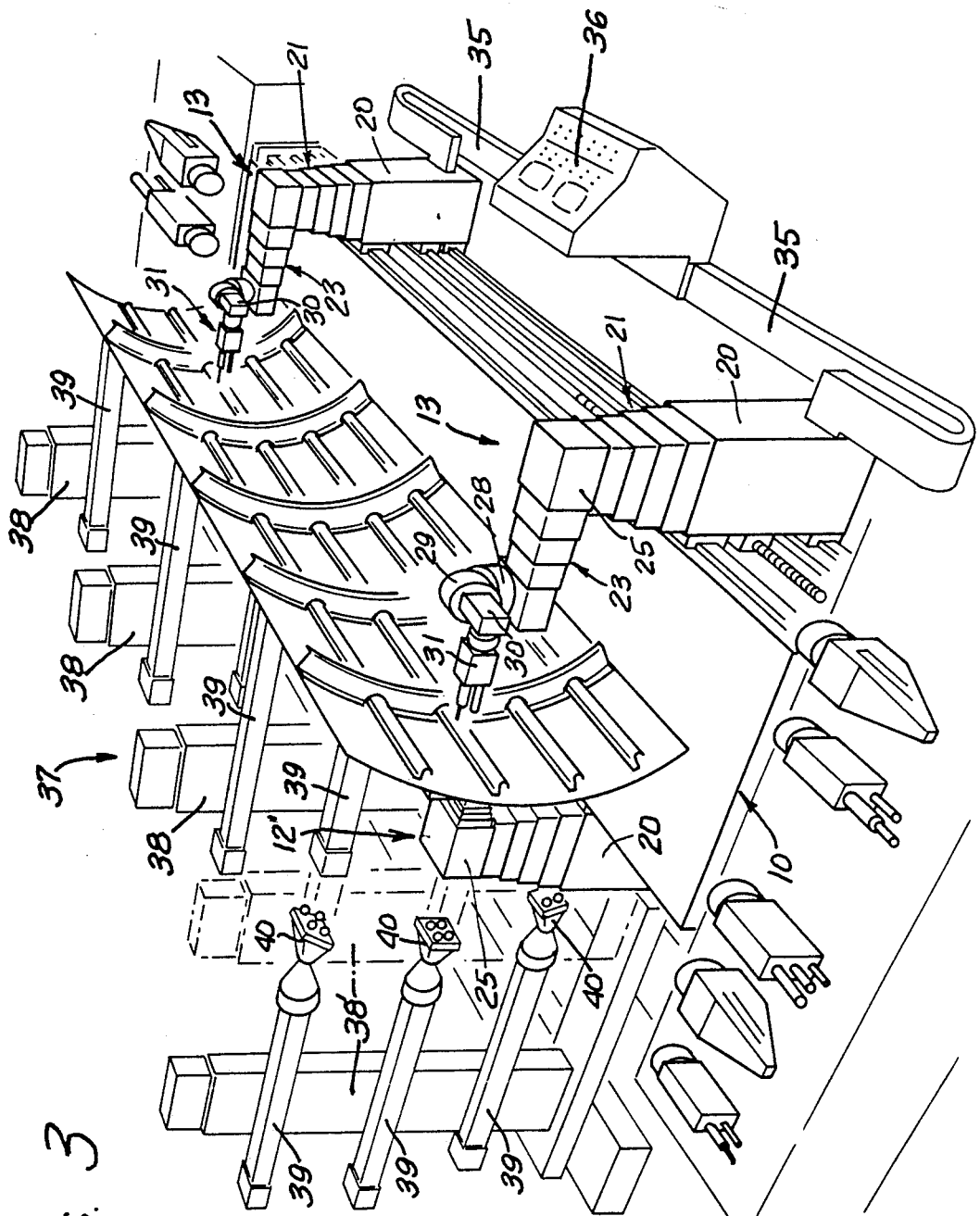
FIG. 3 is another schematic perspective view of the same machine, showing a different form of workpiece holding fixture.

The electric motors driving the leadscrews 33, and the motors contained within each of the pylons 12, 13, are connected by conductor wires in flexible conduits 35 to a control console 36 (FIGS. 1 and 3).

As an alternative arrangement, the pair of rotatable leadscrews 33 on each side of the machine base 10 could be replaced by a single, fixed, nonrotatable leadscrew, with rotatable nuts 34 on each pylon. Thus, the relative rotational movement between leadscrew 33 and nut 34 would be accomplished by turning the nut on the stationary leadscrew, rather than by turning the leadscrew within the stationary nuts.

Figure 2:
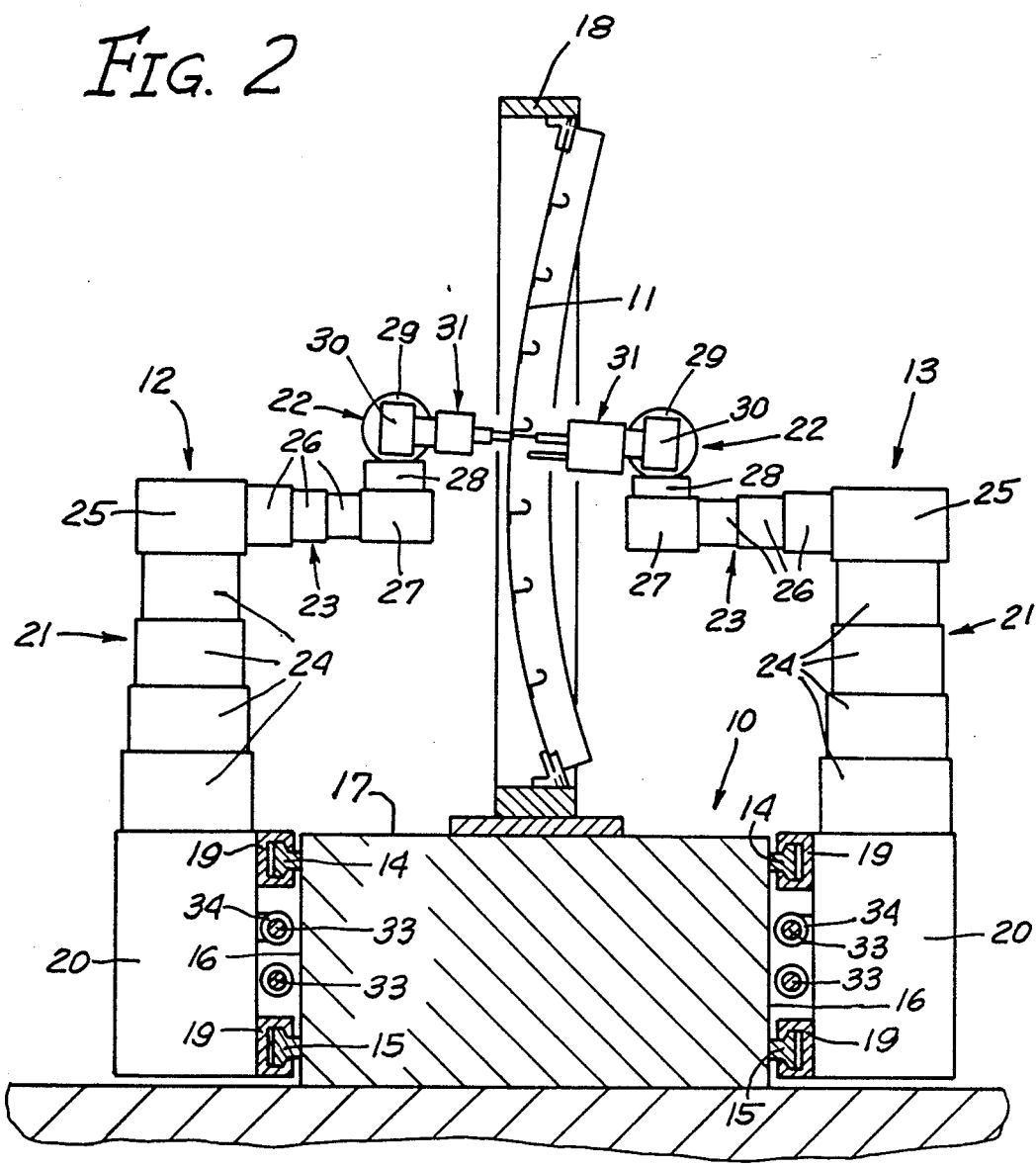
FIG. 2 is a vertical cross-section through the machine of FIG. 1, showing the two pylons on opposite sides of the machine base, and also showing the C-frame configuration of the machine.

FIG. 3 shows another arrangement of the invention using a different workpiece-holding structure, in place of the holder 18 of FIGS. 1 and 2. In this case, the workpiece 11 is held by a flexible fixture 37 which engages the workpiece at a plurality of points on the back side thereof. The flexible fixture 37 comprises a plurality of pylons 38 which are spaced apart from one another along the back side of the machine base 10 and individually movable parallel to the sides of the machine base and also movable toward and away from the workpiece. Carried by each of the pylons 38 are vertically spaced horizontal arms 39, each of which is movable up and down on the pylon, as well as horizontally toward and away from the workpiece. Mounted on the end of each arm 39 toward the workpiece is a contact member 40, which is movable about 3 axes of rotation with respect to the arm, and which has a plurality of attachment devices such as suction cups or clamps that are adapted to be detachably fixed to the workpiece.

One important advantage of the flexible fixture 37 is that the pylons 38, arms 39 and contact members 40 can be adjusted to accommodate the geometry of the workpiece 11, after which a succession of identical workpieces can be held in place for attachment of rivets or fasteners, without any adjustment of the fixture being required. The pylons 38 and arms 39 are preferably motor-driven and may be controlled from the console 36, or from a separate control console (not shown) dedicated to the fixture 37.

During operation of the riveting/fastening machine, the pylon 12 on the back side of the workpiece advances along rails 14, 15, and eventually reaches the point where it must pass from one side of the flexible fixture pylon 38 to the other side thereof. At this point, the fixture pylon 38 disconnects the suction cups or clamps on the contact member 40 from the workpiece, and the pylon 38 moves away from the workpiece far enough to allow the machine pylon 12 to pass. Once the machine pylon 12 is clear of the fixture pylon 38, the latter moves back into position to re-engage the workpiece with the contact members 40. In FIG. 3, the nearest fixture pylon 38' is shown in dot-dash lines at the position where it is attached to the workpiece, and in solid lines where it is moved back away from the workpiece to allow the machine pylon 12' to get by.

The machine can be expanded as needed to accommodate extra long workpieces, as shown in FIG. 4, or to handle increased work load in the form of smaller workpieces, as shown in FIG. 5. In these drawings, the initial module A with two pairs of pylons, has been expanded by the addition of modules B and C, each with a single pair of pylons. The expanded machine is now capable of handling extra long workpieces 11, or a plurality of smaller workpieces, as in FIG. 5. In each case, the pylons are individually controllable, and as a result, are capable of performing twice as much work as could be produced with just two pairs of pylons. In comparison to the conventional C-frame riveting machine with the workpiece being repositioned for each rivet, the machine described here is capable of finishing the riveting process at least four or more times faster.

FIG. 6 is a schematic diagram showing the coordinates and three main planes of workpieces in which rivets or other fasteners can be processed with this machine. The coordinates x, y and z define a first vertical plane x—z, a second vertical plane y—z perpendicular to plane x—z, and a horizontal plane x—y perpendicular to both of the vertical planes x—z and y—z. This general arrangement of planes is exemplified in FIG. 7, which shows a workpiece having panels x—z, y—z and x—y, corresponding to the planes in FIG. 6.

For processing rivets on the x—z plane, pylons 12A and 13A work together on opposite sides of the plane, in the same way as shown in FIGS. 1 and 2. To process rivets on the y—z plane, the tool assembly 31 of pylon 13A is turned 90° so that its tools are directed against the far side of plane y—z, and coooperate with the tools of assembly 31 on pylon 13B on the rear side of the plane. To process rivets in the horizontal plane x—y, the tool assembly 31 of one of the pylons would be positioned directly under the plane x—y, while the tool assembly 31 of another pylon would be positioned directly over the plane x—y, with the tools of the two assemblies cooperating in the usual manner. Thus, the present machine is capable of processing rivets on large box-like structures, which cannot be done with conventional C-frame riveting machines. Heretofore, automated rivet processing has been limited to what is essentially one main plane, and any rivets that had to be processed on planes more-orless perpendicular to the main plane were done manually.

FIG. 8 is a fragmentary elevational view of an alternative form of pylon 41 in which the pylon base 20 is slidably supported on rails 42 and 43 by linear bearings 44. In this case, only the one rail 42 at the bottom of pylon base 20 is mounted on the side of the machine base 10, while the other rail 43 at the top end of the pylon base and on the opposite side thereof is mounted on the extended foundation 45 of the machine. The advantage of this arrangement is that both of the linear bearings 44 and rails 42, 43 are placed in compression, instead of one of them being under tension, as in FIGS. 1 and 2. Another advantage is that the machine base 10 can be made lower so as to allow the machine to handle larger workpieces.

For increased flexibility of the machine, the pylons 12, 13 can be made with an additional rotational axis, as shown in FIG. 9, whereby the horizontally extendable portion 23 can be rotated up to 360° so as to increase the reach of the machine and its ability to handle workpieces.

It is believed that the operation of the invention is more or less clear from the foregoing description. The primary advantage of the machine is that large workpieces are held stationary in the vertical position during the entire riveting or other operation, and the machine pylons are caused to move from one riveting station to the next. At each station, the tools are brought up against the workpiece from opposite sides thereof, and in proper alignment with one another to successively perform the operations of clamping, drilling, feeding the rivet into the hole, and then squeezing the rivet. Other operations such as applying sealant, or quality control inspection, are likewise performed by moving the machine pylons along the length and breadth of the stationary workpiece from one station to the next, and at the same time elevating, and if necessary, rotating the tool holder with its tool assembly to position the tools as required.

In the claims, certain terms are to be construed as having the following meanings:

"pylon" is defined as any slender, vertical structure having structural strength to withstand the forces to which it will be subjected.

"processing" is defined as performance of one or more machine operations which lead to completion of a particular task.

"companionate tools" is defined as tools that cooperate with one another or work together to perform a function.

While I have shown and described in considerable detail what I believe to be the preferred forms of the invention, it will be understood by those skilled in the art that the invention is not limited to such details but might take various other forms within the scope of the following claims.

What is claim is:

1. A riveting machine for riveting sheet metal to stringers or other structural members on a 3-dimensional workpiece having length, width and height, such as large aircraft wing or fuselage panels, comprising:
    a horizontal base having laterally spaced, generally parallel opposite sides;
    means for fixedly supporting the workpiece in a stationary, generally vertical position on said machine base between said opposite sides with its sheet metal surfaces extending generally parallel to the sides;
    at least one riveting unit mounted on said machine base and movable with respect thereto, said riveting unit consisting of a pair of opposed pylons disposed on opposite sides of the workpiece;
    each of said pylons comprising a first vertical component slidably supported for horizontal movement along the adjacent base side, and a
    second horizontal component mounted on said first component with its longitudinal axis extending perpendicular to the line of travel of the pylon, said second component being movable vertically on said first component for a distance to enable it to reach from the top edge of the workpiece to the bottom edge thereof, and one end of said second component being extendable toward and away from the workpiece for a distance to enable it to reach the full width of the workpiece;
    a tool assembly holder mounted on said one end of said second component of each of said pylons, said tool assembly holder being rotatable about horizontal and vertical axes, and said holder being adapted to detachably receive a tool assembly; and
    each of said tool assemblies consisting of tools for successively clamping the sheet metal, drilling holes, inserting rivets, and heading the rivets, the tools on one side of the workpiece being axially aligned with and companionate to the tools on the other side, so that simultaneous operation of the opposed tools performs the successive steps of the riveting operation.

2. A riveting machine as in claim 1, wherein said machine base has a horizontal rail mounted on at least one of said opposite sides, said first vertical component of the associated pylons being disposed on one side of said rail;
    a second horizontal rail mounted on the extended foundation of said machine base on the opposite side of said associated pylon and at a substantial distance above said first-mentioned rail; and
    linear bearings on said first vertical component of said associated pylon slidably engaging both said first-named rail and said second horizontal rail.

3. A riveting machine as in claim 1, wherein said means for fixedly supporting the workpiece comprises a workpiece holding frame that is adjustably mounted on said machine base.

4. A riveting machine as in claim 1, wherein said means for supporting the workpiece comprises a plurality of workpiece holder pylons spaced apart along the length of the workpiece on one side thereof, each of said workpiece holder pylons being movable toward and away from said workpiece;
    a plurality of vertically spaced horizontal arms carried by each of said workpiece holder pylons, said arms being movable toward and away from the workpiece; and
    a contact member on the end of each of said arms which is releasably engageable with the workpiece to hold the same.

5. A riveting machine as in claim 1, wherein said machine base has pairs of vertically spaced, parallel, horizontal rails mounted on opposite sides thereof; and
    linear bearings on said first vertical component of each of said pylons slidably engaging said rails.

6. A riveting machine as in claim 4, which further includes a rotatable leadscrew extending parallel to said rails on each of said opposite sides of said base; and
    a nut on said first vertical component of each of said pylons meshing with the threads of the associated leadscrew, whereby the pylons are moved linearly along said rails when their respective leadscrews are rotated.

7. A multi-function machine as in claim 1, including means on said machine base for moving said pylons linearly along the length of the machine base.

8. A riveting machine as in claim 1, wherein said second horizontal component of said pylon is rotatable relative to said first vertical component about a vertical axis of rotation.

9. A riveting machine as in claim 1, wherein each of said pylons comprises a base portion that is slidably mounted on one of said opposite sides of said machine base, and said first vertical component of each of said pylons is telescopically extendable from its associated base portion.

10. A riveting machine as in claim 1, wherein said second horizontal component is telescopically extendable from the top end of said first vertical component.

* * * * *